US010364691B2

(12) United States Patent
Curlier et al.

(10) Patent No.: US 10,364,691 B2
(45) Date of Patent: Jul. 30, 2019

(54) TURBOMACHINE COMPRISING A VENTILATION SYSTEM

(71) Applicant: Safran Aircraft Engines, Paris (FR)

(72) Inventors: Augustin Marc Michel Curlier, Boissise la Bertrand (FR); Nicolas Aussedat, Melun (FR)

(73) Assignee: Safran Aircraft Engines, Paris (FR)

( * ) Notice: Subject to any disclaimer, the term of this patent is extended or adjusted under 35 U.S.C. 154(b) by 384 days.

(21) Appl. No.: 15/156,660

(22) Filed: May 17, 2016

(65) Prior Publication Data

US 2016/0340053 A1  Nov. 24, 2016

(30) Foreign Application Priority Data

May 21, 2015  (FR) ...................................... 15 54582

(51) Int. Cl.
*F02D 9/04* (2006.01)
*F01D 9/06* (2006.01)
(Continued)

(52) U.S. Cl.
CPC ............. *F01D 9/065* (2013.01); *B64D 41/00* (2013.01); *F01D 9/041* (2013.01); *F01D 15/10* (2013.01);
(Continued)

(58) Field of Classification Search
CPC ........ F01D 9/065; F01D 25/28; F01D 25/162; F02C 7/18
See application file for complete search history.

(56) References Cited

U.S. PATENT DOCUMENTS 3,084,849 A * 4/1963 Dennison ............ F04D 29/0563
415/115
5,292,227 A * 3/1994 Czachor ................ F01D 25/162
415/142
(Continued)

FOREIGN PATENT DOCUMENTS

EP      2 708 701 A2   3/2014
FR      2 640 319      6/1990
FR      2987401 A1 *   8/2013   ............. F01D 25/28

OTHER PUBLICATIONS

French Preliminary Search Report dated Mar. 17, 2016 in French Application 15 54582 filed on May 21, 2015.

*Primary Examiner* — Richard A Edgar
*Assistant Examiner* — Topaz L. Elliott
(74) *Attorney, Agent, or Firm* — Oblon, McClelland, Maier & Neustadt, L.L.P.

(57) ABSTRACT

A turbomachine subassembly has a radially inner shell and a radially outer shell of an annular gas flow path. A radial arm extends radially between the radially inner and outer shells and delimits an isolated volume which is connected to an inner volume of a chamber partly delimited by the radially inner shell. A segment of a conduit extends radially in the isolated volume, and a ventilation air supply source is connected to supply ventilation air to the isolated volume, whereby ventilation air may be supplied to the chamber through the isolated volume. An external radial end of the radial arm supports a first connection box that closes it off. The internal volume of the radial arm communicates with the ventilation air supply source. An external cylindrical wall of the first connection box fits inside an internal cylindrical wall of the external radial end of the radial arm.

8 Claims, 3 Drawing Sheets

(51) Int. Cl.
    *F02C 7/18*       (2006.01)
    *F01D 25/24*      (2006.01)
    *B64D 41/00*      (2006.01)
    *F01D 15/10*      (2006.01)
    *F01D 9/04*       (2006.01)

(52) U.S. Cl.
    CPC ............... *F01D 25/24* (2013.01); *F02C 7/18* (2013.01); *Y02T 50/675* (2013.01)

(56) References Cited

U.S. PATENT DOCUMENTS

| | | | |
|---|---|---|---|
| 6,439,841 B1* | 8/2002 | Bosel | F01D 9/065 415/142 |
| 6,860,716 B2* | 3/2005 | Czachor | F01D 25/162 415/142 |
| 7,383,686 B2* | 6/2008 | Aycock | F01D 9/065 60/39.511 |
| 8,177,488 B2* | 5/2012 | Manteiga | F01D 9/065 415/108 |
| 9,011,079 B2* | 4/2015 | Coign | F01D 5/188 415/115 |
| 9,834,312 B2* | 12/2017 | Beaujard | F01D 25/28 |
| 2010/0236215 A1 | 9/2010 | Venkataramani et al. | |
| 2014/0205447 A1 | 7/2014 | Patat et al. | |
| 2016/0230565 A1* | 8/2016 | King | F01D 5/187 |

\* cited by examiner

TURBOMACHINE COMPRISING A VENTILATION SYSTEM

TECHNICAL DOMAIN

The invention consists of an aircraft turbomachine comprising a ventilation system for a generator installed downstream from the low pressure turbine.

Due to its location, the generator may become very hot, therefore additional means have to be associated with it to cool it by ventilation air and these ventilation means have to be located in spaces that have no influence on operation of the turbomachine.

STATE OF PRIOR ART

As part of the development of energy management in an aircraft, it has been proposed that an electrical current generator could be added into the turbomachine, for example to supply power to an electrical deicing system.

In a conventional turbofan type turbomachine, a generator is driven by means of a high pressure (HP) body of the turbomachine through a reduction gear, as part of an equipment assembly commonly referred to as the "accessory gear box" or AGB.

It has been proposed that an additional generator driven by a low pressure shaft of the turbomachine can be added, located in the extension of this low pressure shaft, inside a chamber formed by a turbine frame hub.

This generator is supplied with lubrication fluid that also cools it. But this lubrication fluid cannot completely cool the generator.

Consequently, it has been proposed to add a ventilation circuit for the generator that comprises a circuit supplying air to the chamber in which the generator is located.

The ventilation circuit comprises particularly an air circulation segment that passes through a radial arm of the turbine frame.

A plurality of conduits already passes through the radial arms, limiting the available space for one or more additional conduits to supply the chamber with sufficient ventilation air.

It has also been proposed to supply the internal volume of radial arms with ventilation air. A ventilation air pressurisation volume is formed around the turbine frame for this purpose. This volume can be created by installing an additional shell around the turbine frame.

However, according to one embodiment of recent turbomachines, the turbine frame is fixed to a support ring by means of mounting clevises. These clevises prevent installation of such an additional shell.

The purpose of the invention is a system to supply ventilation air to the chamber through the internal volume of the radial arms, that can connect the internal volume of the radial arms to a ventilation air source.

PRESENTATION OF THE INVENTION

The invention relates to a turbomachine subassembly comprising a radially inner shell and a radially outer shell which radially delimit, between the radially inner shell and the radially outer shell, an annular gas flow path, a chamber delimited at least partly by the radially inner shell, at least one radial arm that extends radially between the radially inner shell and the radially outer shell, wherein the at least one radial min delimits an isolated volume of the annular flow path, which isolated volume is connected to an inner volume of said chamber, and wherein a segment of at least one conduit extends radially in said isolated volume, and a ventilation air supply source connected to supply ventilation air to said isolated volume delimited by said at least one radial arm, whereby ventilation air may be supplied to the chamber delimited at least partly by the inner shell through the isolated volume delimited by said at least one radial arm, wherein an external radial end of the at least one radial arm supports a first connection box that closes off the external radial end of the at least one radial arm, wherein a connection of the segment of the at least one conduit connects the segment to a remainder of the at least one conduit, wherein the internal volume of the at least one radial arm communicates with the ventilation air supply source, wherein the first connection box comprises an external cylindrical wall that fits inside an internal cylindrical wall of the external radial end of the at least one radial arm.

The connection of the internal volume of a radial arm to both the chamber and the connection box makes it possible to circulate ventilation air through the radial arm volume, without adding an additional conduit in the arm. The connection box makes it possible to connect the internal volume of the arm, without being hindered by the presence of the turbine frame support means.

Preferably, the first connection box is mounted to be free to slide radially relative to the external radial end of the arm.

Preferably, the internal radial end of said arm opens up directly into the chamber.

Preferably, it comprises a second connection box that is installed close to the internal radial end of the arm and that is radially offset inwards relative to the internal radial end of the arm.

Preferably, it comprises a support ring on which all second connection boxes are installed.

Preferably, the second connection box comprises a first channel oriented principally along the radial direction, to which the internal radial end of the segment associated with it is connected, and a second channel oriented principally parallel to the main axis of the turbomachine, that extends the first channel and that is connected to the remainder of the conduit.

The invention also relates to an aircraft turbomachine, that comprises such subassembly and wherein the air ventilation supply source draws off air from a secondary flow path of the turbomachine.

Preferably, the turbine frame is connected to a support device through a suspension lattice that is connected to the outer shell of the frame.

BRIEF DESCRIPTION OF THE DRAWINGS

Other characteristics and advantages of the invention will become clear after reading the following detailed description for which reference can be made to the appended figures including the following to facilitate understanding.

DETAILED PRESENTATION OF PARTICULAR EMBODIMENTS

Figure 2:
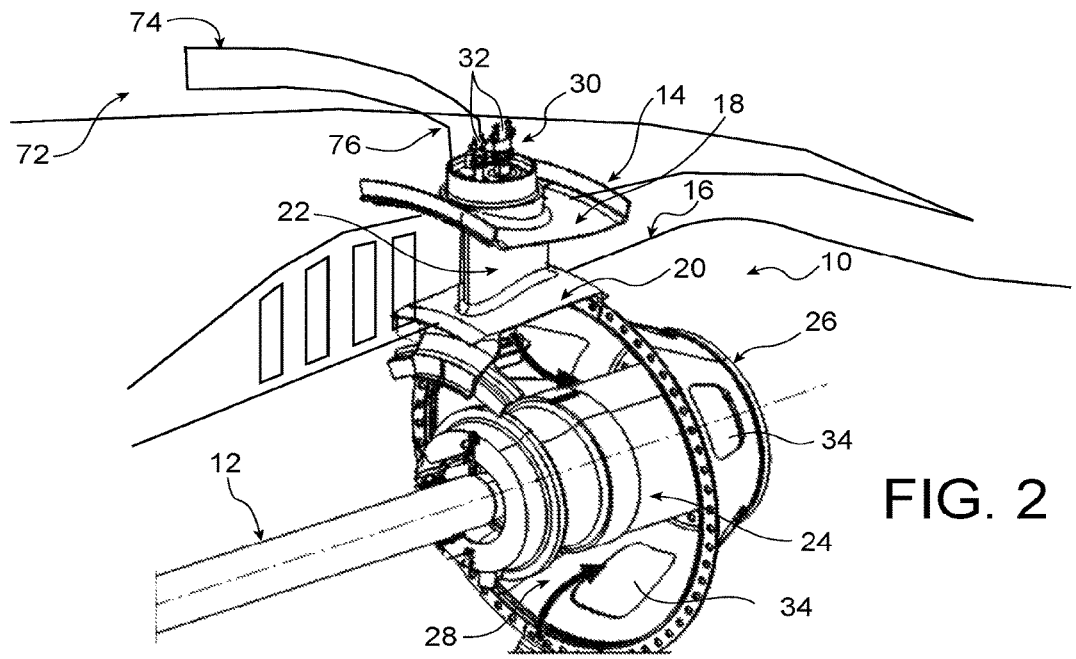
FIG. 2 is a diagrammatic exploded perspective view of the downstream part of the turbomachine shown in FIG. 1.

For the description of the invention, the axial orientation along the upstream to downstream direction will non-limitatively be taken as the axial direction from left to right as shown in FIG. 2.

Figure 1:
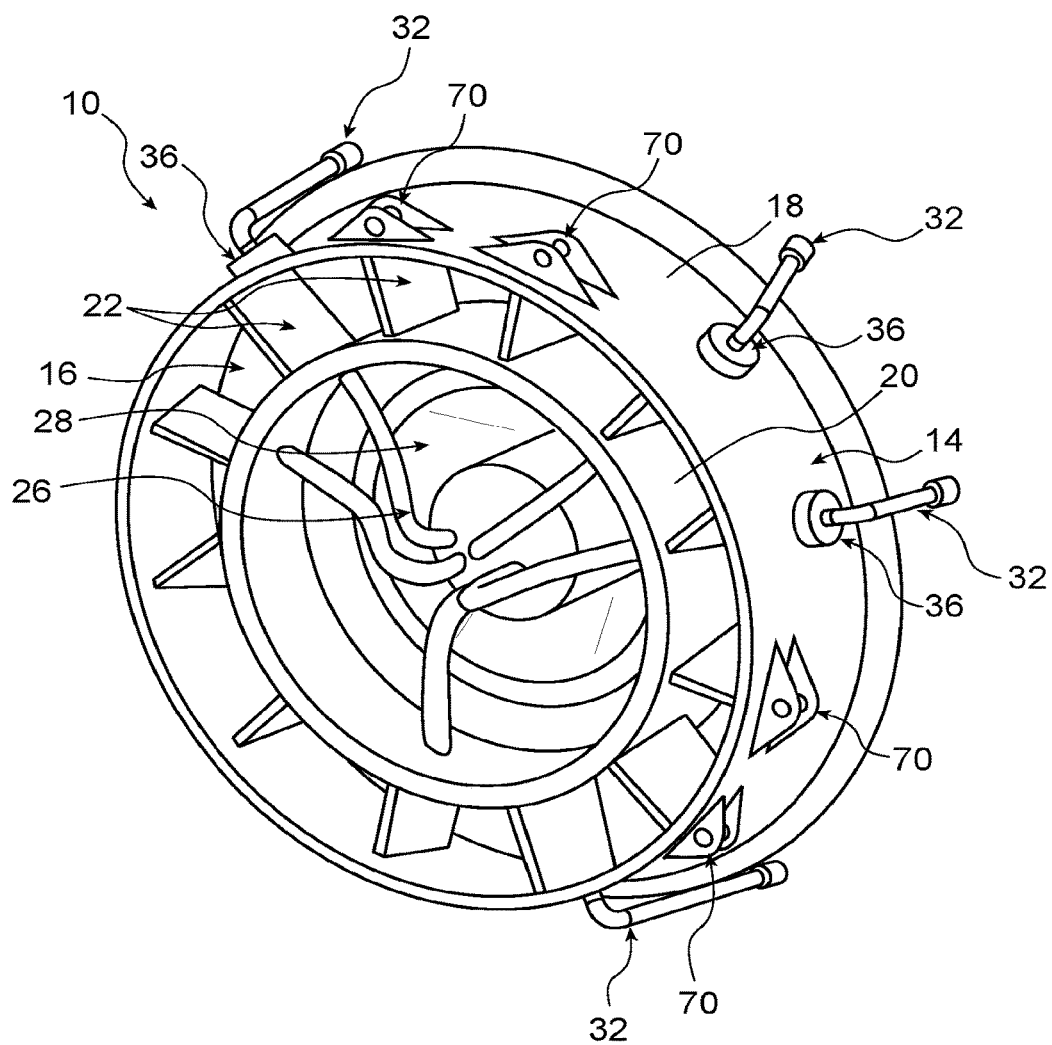
FIG. 1 is a diagrammatic perspective view of the downstream part of a turbomachine comprising a generator and ventilation means of the chamber in which this generator is located.

FIGS. 1 and 2 show a downstream part of a turbomachine 10, for example an aircraft turbomachine.

The turbomachine 10 comprises particularly a low pressure shaft 12 that is driven by the low pressure turbine of the turbomachine 10 and a turbine frame 14 delimiting the downstream part of an annular gas flow path 16.

The turbine frame 14 comprises a radially outer shell 18, a radially inner shell 20 coaxial with the main axis of the turbomachine 10 and radial arms 22 that connect the shells 18, 20 to each other.

The radial arms 22 are hollow so that conduits and cables can pass through the annular flow path 16, while protecting them from the gas flow in the annular flow path 16.

The turbomachine also comprises a set of beams or connecting rods (not shown) forming a suspension lattice, used to attach the turbine frame 14 to a peripheral support component such as a support ring.

This lattice is located outside the outer shell 18 and surrounds it.

The outer shell 18 comprises clevises 70 projecting radially outwards and that are connected to the beams or connecting rods, to connect the turbine frame 14 to this lattice.

The turbomachine 10 also comprises an electrical current generator 24 installed coaxially with the low pressure shaft 12, and downstream from it. The rotor (not shown) of the generator 24 is connected to and is driven by the low pressure shaft 12.

The turbomachine 10 comprises a downstream shell 26 that extends the inner shell 20 of the turbine frame 14 in the downstream direction. These two shells 20, 26 delimit a chamber 28 in which the generator 24 is located.

The generator 24 is supplied with lubrication fluid through a lubrication circuit 30 particularly including two conduits 32 (a lubrication fluid supply conduit and a discharge conduit) that pass through a radial arm 22.

The generator 24 will warm up during operation of the turbomachine 10. The lubrication circuit 30 cools internal components of the generator 24, for example such as bearings and windings. However, heat extraction resulting from this lubrication is insufficient and therefore must be assisted by ventilation of the chamber 28 inside which the generator 24 is located.

The turbomachine 10 comprises a ventilation device for the generator 24 for this purpose, that consists of supplying fresh air drawn off from a secondary flow path 72 of the turbomachine 10, to the chamber 28. This ventilation air is then evacuated along the downstream direction through orifices 34 formed in the downstream shell 26.

As shown schematically in FIG. 2, the air draw off is achieved by one or more scoop 74 arranged in the secondary flow path 72 and which are open towards the upstream of the secondary flow path 72.

Ventilation air is supplied to the chamber 28 by circulating ventilation air directly through the internal volume of each radial arm 22. In other words, ventilation air flows around the conduits 32 and cables located in the various radial arms 22.

This means that there is no need to add one or several ventilation conduits through the radial arms 22, because the available space there is already very limited.

To the end, the air drawn off by the scoops 74 is redirected to the radial arms 22, performing the ventilation of chamber 28, via conduits 76 extending from the secondary flow path 72 to the outer radial end of each arm 22.

Each radial arm 22 thus delimits a radial conduit through which one or more conduits pass and through which a ventilation air flow also passes directly.

The radial conduit delimited by each arm 22 is directly connected to the internal volume of the chamber 28 in which the generator 24 is located, in other words the internal radial end of the arm 22 opens up in the chamber 28.

On the other hand, the internal volume of each arm 22 is isolated from the volume surrounding the outer shell 18 of the turbine frame 14. To achieve this, the external radial end of the arm 22 is hermetically sealed to air by an external connection box 36.

According to a variant embodiment, the external connexion box 36 closes the external radial end of the arm 22 by allowing air circulation. Indeed, due to the difference in expansion between the arm 22 and the external connection box 36, contact between these two components cannot guarantee a perfect seal.

In addition, the ventilation air's pressure within the arm 22 is substantially the same as the pressure from the air extraction means and feeding the box 36. There is no sur-pressure with respect to the surroundings of the external box 36.

Possible leaks then have low impact on the effectiveness of the ventilation of the enclosure 28.

The conduits 32 and cables that pass through the arm 22 associated with the external connection box 36 pass through this external connection box 36.

Preferably, each conduit 32 comprises a segment 38 that is located in the associated arm 22 and is connected to the remainder of the conduit 32 by means of the external connection box 36 and an internal connection box 40 located at the internal radial end of the arm 22.

This facilitates installation of a conduit 32 by installing each segment 38 in the associated arm 22 by fixing it to the two boxes 36, 40, and then by connecting the other two parts of the conduit 32 to the two boxes 36, 40, thus connecting them to the ends of the segment 38.

As already mentioned, the internal volume of the arm 22 opens up directly into the chamber 28. Consequently and preferably, the internal connection box 40 is radially offset inwards relative to the internal radial end of the arm 22.

Figure 4:
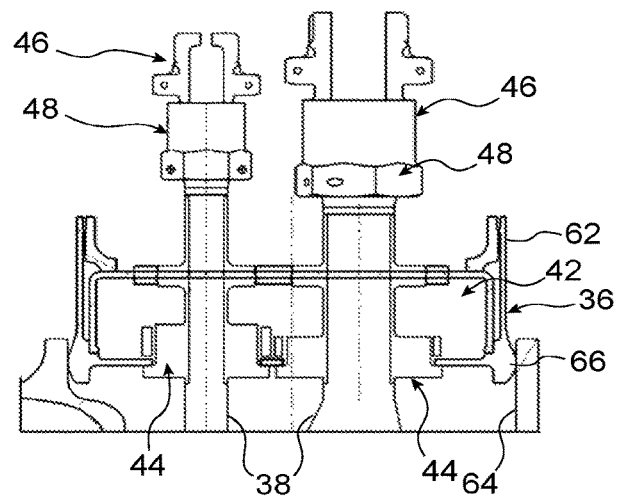
FIG. 4 is a larger scale detailed view of the external radial end of the arm shown in FIG. 3.

As can be seen in more detail in FIG. 4, the external connection box 36 comprises an internal volume 42 that communicates with the internal volume of the arm 22 and that can be connected to conduits 76 connecting to each scoop 74.

The external connection box 36 comprises flanges 44 supporting segments 38 of the conduits 32 and connectors 46 formed at the ends of the segments 38, for connection of each segment to a part of the associated conduit 32.

Each connector 46 is made in a known manner, in this case it is a nipple and nozzle type connector locked by a nut 48.

Figure 5:
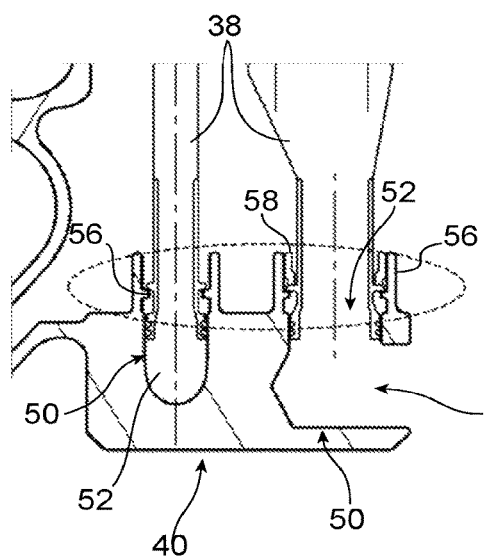
FIG. 5 is a larger scale detailed view of the internal radial end of the arm shown in FIG. 3.
Figure 6:
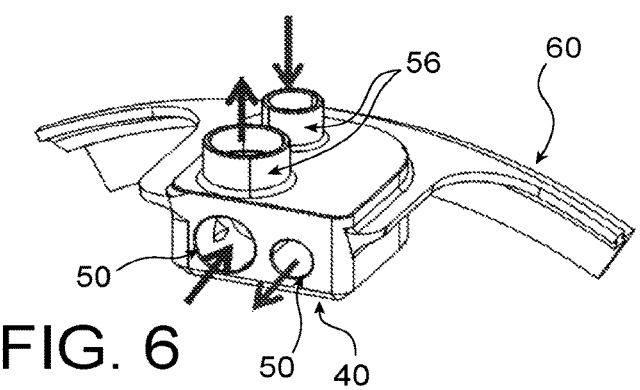
FIG. 6 is a detailed perspective view of the connection box shown in FIG. 5.

As can be seen in more detail in FIGS. 5 and 6, the internal connection box 40 comprises an internal pipe 50 associated with each conduit 32 that is associated with the arm 22.

Each pipe 50 comprises a channel 52 oriented principally radially, and a channel 54 oriented parallel to the main axis of the turbomachine.

The radial channel 52 opens up radially outwards and it may be connected to the internal radial end of the associated segment 38. In this case, the radial channel 52 is extended radially outwards by a threaded sleeve 56 that cooperates with a nut 58 that tightens the internal radial end of the associated segment 38 in the radial channel 52.

The axial channel 54 will be connected to a part of the conduit 32 associated with the segment 38. According to the embodiment shown, the two radial channels 52 are aligned in the axial direction. The axial channels 54 are preferably offset laterally relative to each other, to avoid hindering fluid flow or their connection to the associated conduit 32.

Each internal connection box 40 is located radially at a distance from the internal radial end of the associated arm 22, consequently it is located radially at a distance from the inner shell 20.

The internal connection boxes 40 are supported through a support ring 60 that is located inside the chamber 28 and that is connected to a mechanical interface of the turbine frame, which in this case is a bearing support flange.

All internal connection boxes 40 are fixed to the support ring 60. As non-limitative examples, internal connection boxes 40 are attached to the support ring 60 by bolting, welding, or by making the boxes 40 and the support ring 60 in a single piece.

During operation of the turbomachine 10, variations in operating and temperature conditions in the turbomachine cause dimensional variations of turbomachine components due to expansion.

Dimensional variations of turbomachine components also take place during a transition between a cold state of the turbomachine (in other words before it starts) in which all components of the turbomachine are cold, and an operating state in which some components are very hot and other components such as coolant flow conduits are still cold.

Thus, in particular, the length of the segments 38 can vary, or the relative distance between the external connection box 36 and the internal connection box 40 can also vary.

To make such dimensional variations possible, one of the two connection boxes 36, 40 is installed free to slide relative to the radial end of the arm 22 associated with it, while the other connection box 40, 36 is fixed radially relative to the radial end of the arm 22 associated with it.

According to one preferred embodiment shown on the figures, the external connection box 36 is installed free to slide radially relative to the external radial end of the arm 22. Consequently, the internal connection box 40 is fixed relative to the internal radial end of the arm 22.

According to another embodiment that enables the dimensional variations of segments 38 relative to arm 22, the hydraulic connection means of the internal radial ends of the segments 38 with the internal box 40 are formed to allow radial sliding of the internal radial ends of segments 38 relative to arm 22, and more particularly relative to the support ring 60 and the internal box 40. For example, the connection means do not include a tightening nut 58 and the external connection box 36 is fixed relative to the external end of the arm 22.

Figure 3:
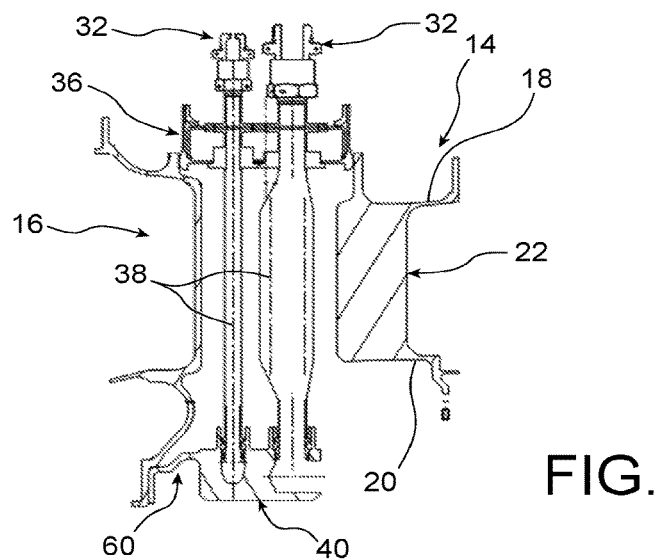
FIG. 3 is a section along an axial plane of a turbine frame arm manufactured according to the invention.

FIG. 3 shows an external connection box that is made according to the embodiment by which dimensional variations of the conduits 32 are made possible due to radial sliding of the external connection box 36 relative to the external radial end of the arm 22.

According to this embodiment, the external connection box 36 comprises an external cylindrical wall 62 that fits inside and at a distance from an internal cylindrical wall 64 of the external radial end of the arm 22.

The external cylindrical wall 62 is provided with an annular bead 66 at its internal radial end that bears in sealed contact with the internal wall 64 of the radial end of the arm 22. The air tightness of this contact is completed by an annular seal, not shown.

The external face of this bead 66 is in the shape of a portion of a sphere, such that the bearing contact between the internal wall 64 of the radial end of the arm 22 and the bead 66 can be maintained even if the orientation of the external connection box 36 is no longer radial, due to different expansions of the two segments 38.

Thus, this bead 66 maintains an air tight contact between the internal wall 64 of the radial end of the arm 22 and the external cylindrical wall 62 of the external connection box 36.

Similarly to what has been mentioned above, the contact between this bead 66 and the internal wall 64 of the radial end of the arm 22 may not be air tight. In this case, in particular, there is no seal between the bead 66 and the inner wall 64 of the radial end of the arm 22.

Such a shape of the cylindrical wall 62 of the contact between the outer connection box 36 and the inner wall 64 of the radial end of the arm 22 is relatively easy to implement through the form of revolution of the faces contacting each other.

This simplifies the installation, both in the design and in its installation, thereby reducing production costs.

The connection boxes 36 located on the outer shell 18 are globally installed between the clevises 70, and their dimensions are such that they do not hinder placement of the suspension lattice of the turbine frame 14.

Also, the invention has been described as being applied to the ventilation of an electric current generator installed in the enclosure 28, it will be understood that the invention is not limited to the ventilation of such a generator 24 and it can also be applied to any other turbomachine component that would be installed in the enclosure 28 such as, and not limited to, a lubricating fluid or fuel pump.

The invention claimed is:

1. A turbomachine subassembly comprising:
 a radially inner shell and a radially outer shell which radially delimit, between the radially inner shell and the radially outer shell, an annular gas flow path,
 a chamber delimited at least partly by the radially inner shell,
 at least one radial arm that extends radially between the radially inner shell and the radially outer shell, wherein the at least one radial arm delimits an internal isolated volume of the annular flow path, which isolated volume is connected to an inner volume of said chamber, and wherein a segment of at least one conduit extends radially in said isolated volume, and
 a ventilation air supply source connected to supply ventilation air to said isolated volume delimited by said at least one radial arm, whereby ventilation air may be supplied to the chamber delimited at least partly by the inner shell through the isolated volume delimited by said at least one radial arm, wherein a radial outer end of the at least one radial arm supports a first connection box that closes off the radial outer end of the at least one radial arm, wherein a connection of the segment of the at least one conduit connects the segment to a remainder of the at least one conduit, wherein the isolated volume of the at least one radial arm communicates with the ventilation air supply source, and wherein the first connection box comprises an external cylindrical wall that fits inside an internal cylindrical wall of the radial outer end of the at least one radial arm.

2. The subassembly according to claim 1, wherein the external cylindrical wall of the first connection box and the internal cylindrical wall of the radial outer end of the at least one radial arm are surfaces of revolution.

3. The subassembly according to claim 1, wherein the first connection box is mounted to be free to slide radially relative to the radial outer end of the at least one radial arm.

4. The subassembly according to claim 1, wherein a radial inner end of said at least one radial arm opens directly into the chamber delimited at least partly by the radially inner shell.

5. The subassembly according to claim 4, further comprising a second connection box that is installed at the radial inner end of the at least one radial arm and that is radially offset inwards relative to the radial inner end of the at least one radial arm.

6. The subassembly according to claim 5, wherein there are a plurality of said radial arms, further comprising a support ring on which second connection boxes of all of said plurality of radial arms are installed.

7. The subassembly according to claim 5, wherein the second connection box comprises a first channel oriented principally along the radial direction, to which the internal radial end of the corresponding segment of conduit is connected, and a second channel oriented principally parallel to a main axis of the turbomachine, which second channel extends the first channel and is connected to the remainder of the conduit.

8. An aircraft turbomachine, comprising the subassembly of claim 1, wherein the ventilation air supply source draws off air from a secondary flow path of the turbomachine.

* * * * *

UNITED STATES PATENT AND TRADEMARK OFFICE
CERTIFICATE OF CORRECTION

PATENT NO. : 10,364,691 B2
APPLICATION NO. : 15/156660
DATED : July 30, 2019
INVENTOR(S) : Augustin Marc Michel Curlier et al.

It is certified that error appears in the above-identified patent and that said Letters Patent is hereby corrected as shown below:

In the Specification

In Column 1, Line 66, delete "min" and insert -- arm --, therefor.

In Column 4, Lines 24-25, delete "connexion" and insert -- connection --, therefor.

Signed and Sealed this
Eleventh Day of February, 2020

Andrei Iancu
*Director of the United States Patent and Trademark Office*